P. SJOSTROM.
LOCK STITCH SEWING MACHINE.
APPLICATION FILED FEB. 17, 1915.

1,286,434.

Patented Dec. 3, 1918.
11 SHEETS—SHEET 7.

Witnesses:
N. C. Lombard
H. C. Mosley

Inventor:
Peter Sjostrom,
by Walter E. Lombard
Atty.

P. SJOSTROM.
LOCK STITCH SEWING MACHINE.
APPLICATION FILED FEB. 17, 1915.
1,286,434.
Patented Dec. 3, 1918.
11 SHEETS—SHEET 8.
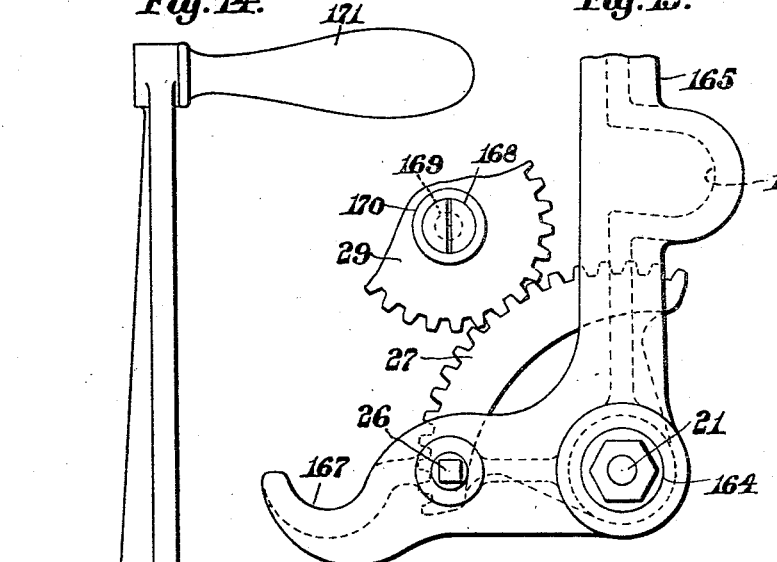
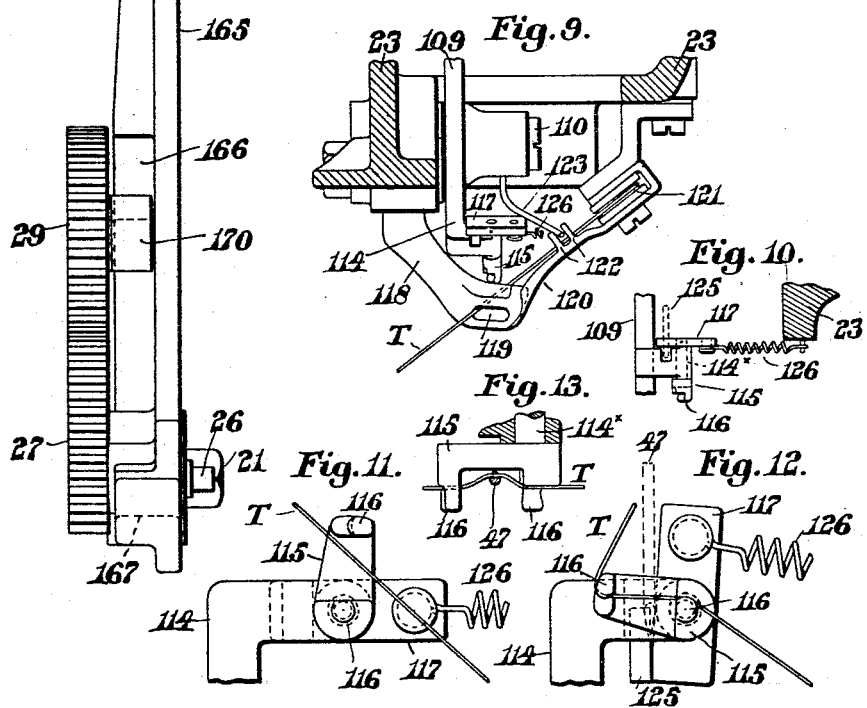
Witnesses:
H. C. Lombard
H. C. Mosley
Inventor:
Peter Sjostrom,
by Walter E. Lombard
Atty.

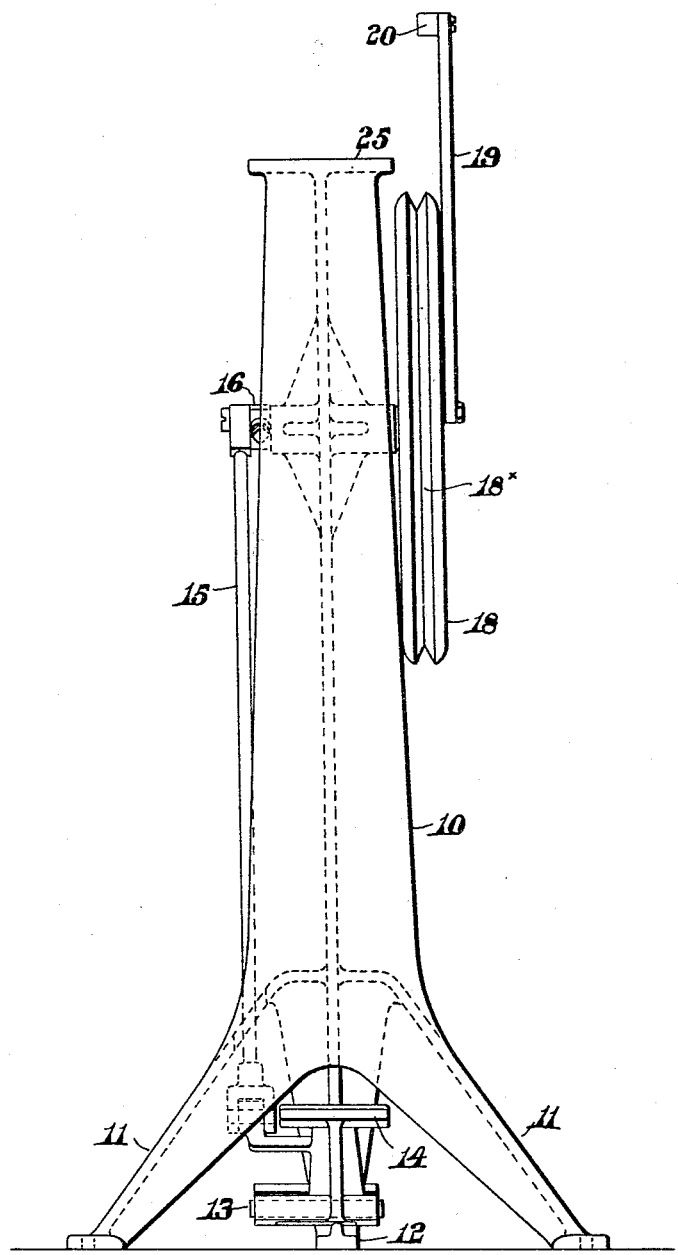

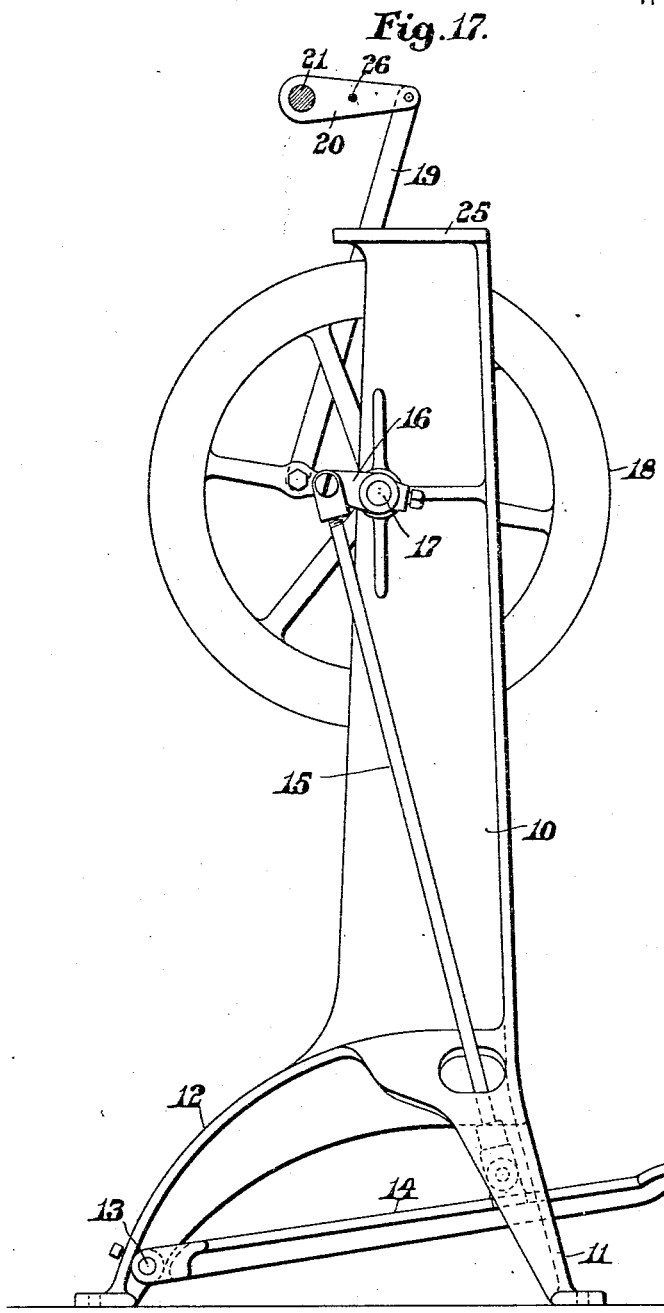

P. SJOSTROM.
LOCK STITCH SEWING MACHINE.
APPLICATION FILED FEB. 17, 1915.

1,286,434.

Patented Dec. 3, 1918.
11 SHEETS—SHEET 11.

Witnesses:
N. C. Lombard
H. C. Moseley

Inventor:
Peter Sjostrom,
by Walter E. Lombard,
Atty.

UNITED STATES PATENT OFFICE.

PETER SJOSTROM, OF MALDEN, MASSACHUSETTS, ASSIGNOR TO VICTOR SHOE MACHINERY COMPANY, OF BOSTON, MASSACHUSETTS, A CORPORATION OF MASSACHUSETTS.

LOCK-STITCH SEWING-MACHINE.

1,286,434.

Specification of Letters Patent.

Patented Dec. 3, 1918.

Application filed February 17, 1915. Serial No. 9,465.

*To all whom it may concern:*

Be it known that I, PETER SJOSTROM, a subject of the King of Sweden, and a resident of Malden, in the county of Middlesex and State of Massachusetts, have invented certain new and useful Improvements in Lock-Stitch Sewing-Machines, of which the following is a specification.

This invention relates to machines for sewing heavy material such as leather and particularly to that class of machines known as welt sewing machines.

The object of the invention is to provide a simple compact sewing machine which can be operated either by power, by treadle, or by hand, and which is especially adapted for use in small factories and repair shops.

The invention consists in certain novel features of construction and arrangement of parts which will be fully understood by reference to the description of the drawings and to the claims hereinafter given.

Of the drawings:

Fig. 9 represents a horizontal section of a portion of the front of the machine, the cutting plane being on line 9—9 on Fig. 2.

Fig. 10 represents a plan view of the thread bending mechanism.

Fig. 11 represents an elevation of the same drawn to an enlarged scale, the thread bending plate being shown in its normal position.

Fig. 12 represents a similar view with the thread bending plate in the position it assumes in bending the thread across the path of the needle.

Fig. 13 represents a plan of the thread bending plate in the position shown in Fig. 12 of the drawings.

Fig. 14 represents an elevation of the lever for operating the machine by hand and the gear segment to which said lever is secured and the gear operated by the oscillation of said segment.

Fig. 15 represents a side elevation of the lower portion thereof.

Fig. 16 represents a front elevation of the standard and the means mounted thereon for operating the machine.

Fig. 17 represents a side elevation of the same.

Similar characters designate like parts throughout the several figures of the drawings.

Figure 3:
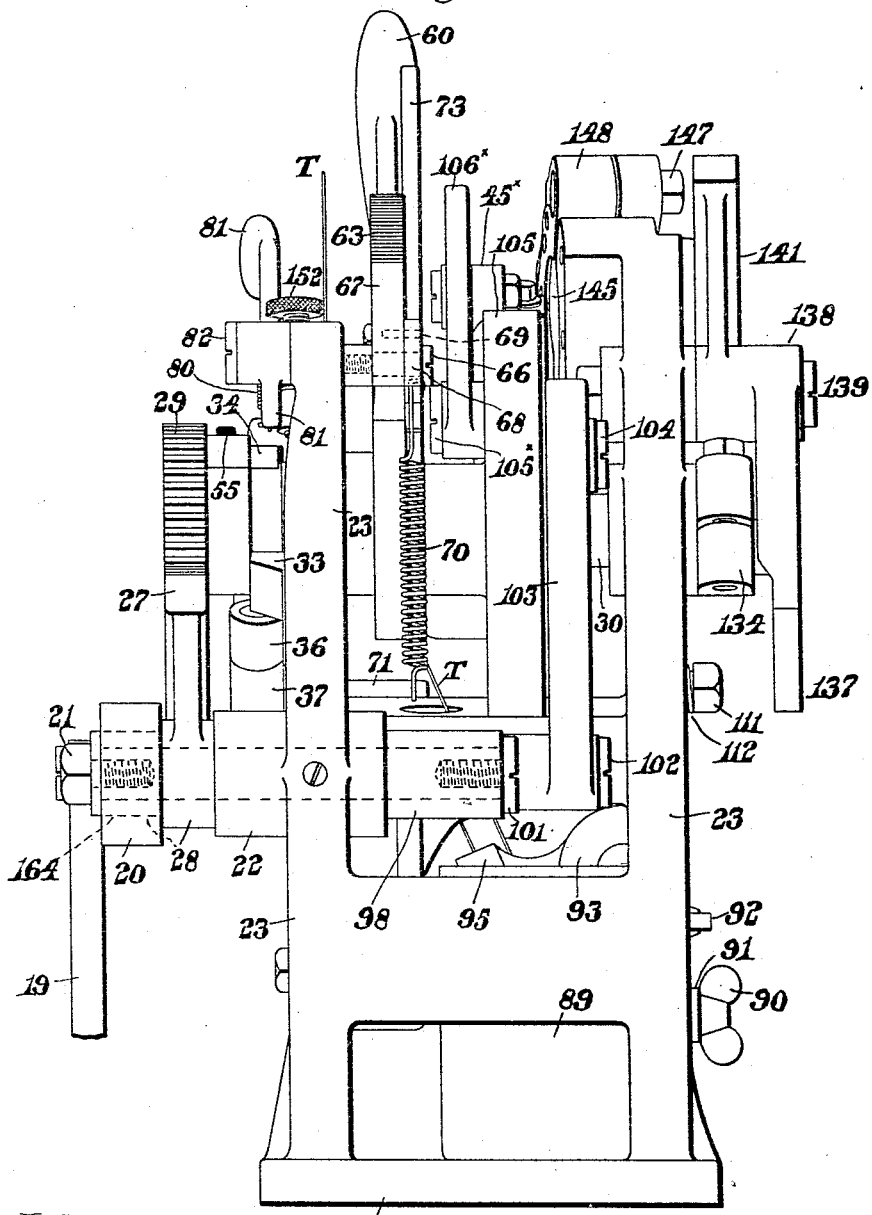
Fig. 3 represents a rear elevation of the same.

In the drawings, 10 is a standard provided with front legs 11 and a rearwardly extending leg 12, to which is pivoted, at 13, a treadle 14. The treadle 14 has pivotally connected thereto one end of a connecting rod 15, the opposite end of which is pivotally connected to a lever 16 secured to the revoluble shaft 17 mounted in a bearing in the standard 10 and having secured to its opposite end the fly wheel 18. This fly wheel 18 has articulated thereto one end of a connector 19, the opposite end of which is articulated to a lever 20. This lever 20 is loosely mounted upon the stud 21 nonrevolubly mounted in a boss 22 formed upon the frame 23, the base 24 of which is secured in any well-known manner to the flanged upper end 25 of the standard 10. The pulley 18 is provided with a groove 18× to receive a belt when it is desired to operate the machine by power, in which case the rod 15 is disconnected from the lever 16. The lever 20 is secured by means of the bolt 26 to the gear segment 27, the hub 28 of which is mounted upon the stud 21 about the axis of which it is adapted to be oscillated. The hub 28 is preferably provided with a reduced cylindrical extension projecting through the hub of the lever 20 as shown in dotted lines in Fig. 3. It is obvious that when rotary movement is imparted to the fly wheel 18 by means of the treadle 14 this rotary movement will be transformed through the medium of the connector 19 to oscillatory movement of the gear segment 27. The teeth of the gear segment 27 mesh with the teeth of the gear 29 secured to a shaft 30 mounted in bearings in the frame 23, in which bearings said shaft is adapted to be oscillated by means of the gear segment 27.

Figure 4:
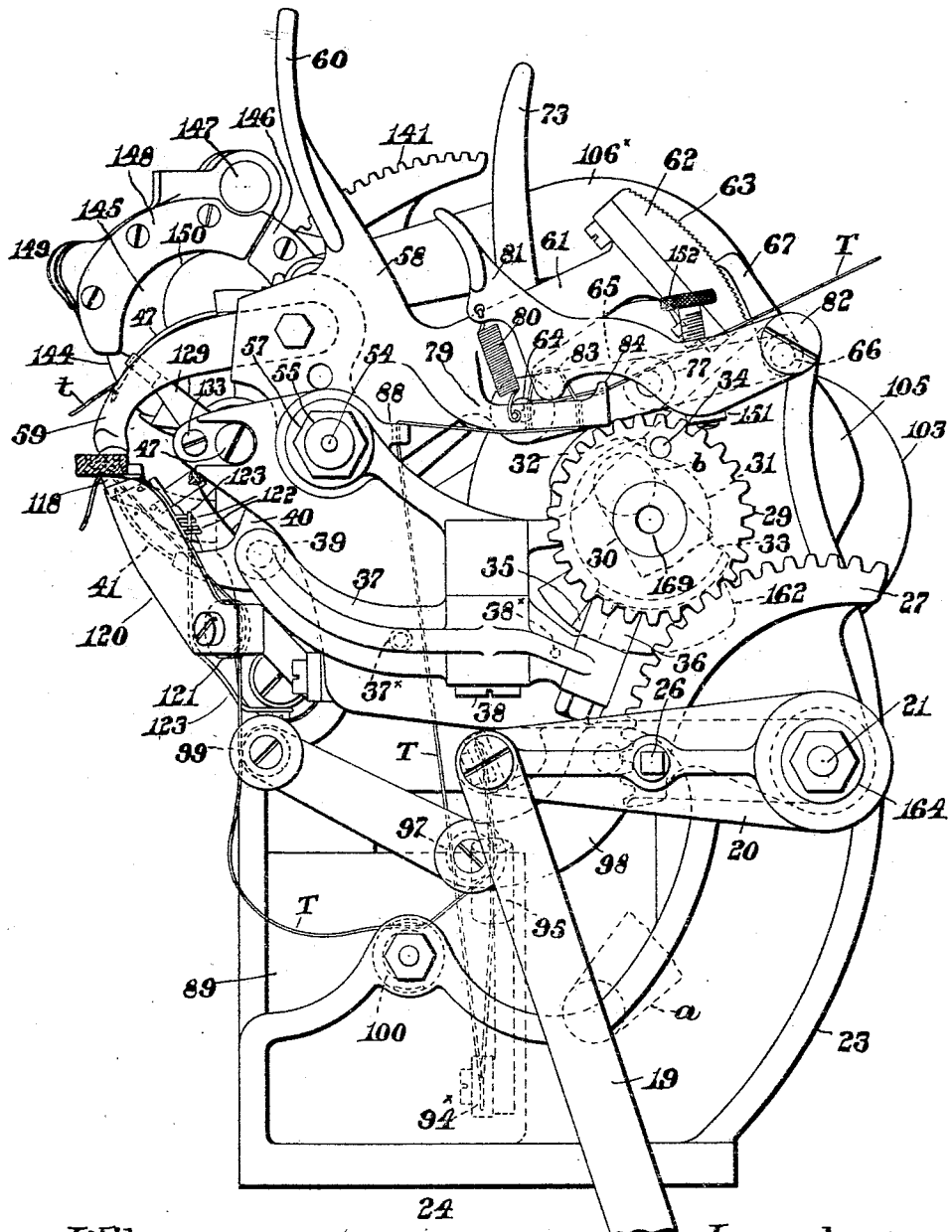
Fig. 4 represents a right hand elevation of the same.
Figure 5:
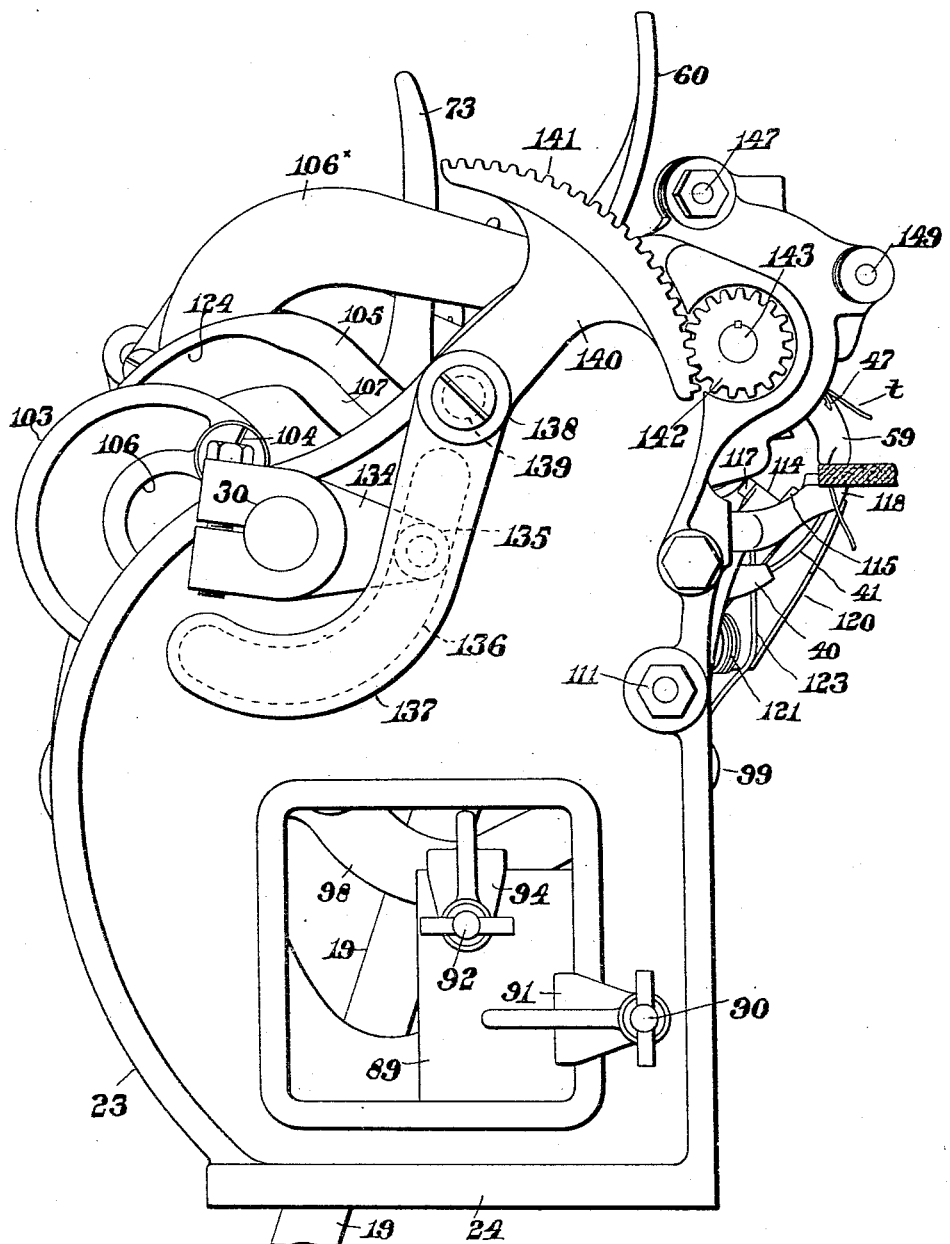
Fig. 5 represents a left hand elevation of the same.

During the oscillation of the gear segment 27 the lever 20 moves through an arc of a circle from the dotted position a to the dotted position b, as indicated in Fig. 4 of the drawings. The shaft 30 has loosely mounted thereon a disk member 31 having formed thereon radial shoulders 32—33 which are adapted to be engaged by a pin 34 extending laterally from the gear 29. This pin 34, during the oscillation of the gear 29, will impart movement to the disk 31 when contacting with either of the shoulders 32—33, while permitting said disk to remain at a standstill at the beginning of the movement of said pin 34 in either direction, that is, while traveling from the shoulder 32 to the shoulder 33 or vice versa.

The disk 31 is provided with a cam projection 35 adapted to engage the truck 36 on a lever 37 pivoted at 38 to the frame 23, the opposite end of said lever 37 being provided with a bearing member 39 adapted to engage the awl carrier 40 when it is desired to feed the work. The awl carrier 40 is provided with the usual curved awl 41. The truck 36 is retained normally in contact with the cam 35 by the spring 37ˣ which forces the front end of the lever 37 outwardly, this outward movement being limited by the stop pin 38ˣ.

The bearing member 39 consists of a screw threaded to the end of the lever 37 and held in adjusted position by means of the clamping nut 42. The awl carrier 40 is mounted upon a pin 43 extending through a boss 44 formed upon the side of the needle carrier 45, said pin being prevented from rotating by means of the clamping screw 46. The needle carrier 45 is provided with the usual curved barbed needle 47 and oscillates about the stud 47ˣ fixed in the frame 23.

The tubular member 50 has a diametral slot 51 at one end in which is positioned the pin 52 mounted in the stop member 49 to prevent said stop member from turning in the tubular member 50. This stop member 49 has a cylindrical shank 53 extending through and beyond said tubular member 50, the outer end being threaded as at 54, and having mounted thereon an adjusting nut 55, by which the position of the stop member 49 may be determined to regulate the amount of separation of the awl carrier and needle carrier. The stop member 49 is forced outwardly by means of a spring 56, the tension of which is greater than the spring 48, so that under ordinary conditions when the awl carrier 40 is moved away from the needle carrier 45 by the spring 48 its outward movement will be determined by the member 49, the spring 56 only yielding when under abnormal conditions to prevent damage to the machine. The spring 56 also serves the purpose of retaining the member 49 in its adjusted position with the hub of the adjusting nut 55 in contact with the clamping nut 57 of the tubular member 50. The tubular member 50 forms a stud upon which is mounted the presser foot carrier 58 having secured thereto the presser foot 59. The carrier 58 has an upward extension 60 formed thereon by which the presser foot may be lifted from the work. The carrier 58 also has a rearward extension 61 to which is secured a ratchet plate 62 having a plurality of ratchet teeth 63 formed thereon in an arc of a circle concentric with the pivot 64 supported by carrier 58 on the pivot 64 is mounted a pawl lever 65, the outer end of which has articulated thereto, at 66, a pawl 67 normally engaging the ratchet teeth 63. The pawl 67 is preferably secured by means of a pin 69 to a lever 68, also pivoted at 66. The lever 68 has secured thereto one end of a spring 70, the opposite end of which is secured to a fixed pin 71, the tension of said spring normally retaining the pawl 67 in engagement with the ratchet teeth 63. The forward end of the lever 68 is positioned within the forked end 72 of a hand lever 73 pivoted at 64 to the presser foot carrier 58, said pivot 64 consisting of a stud extending through the lever 73 and the presser foot carrier 58 and being threaded to the lever 65. The lever 68 is also provided on its under side with a cam projection 74 adapted to be engaged at predetermined times by a cam projection 75, upon a cam disk 76 secured to the shaft 30, in order to disengage the pawl 67 from the ratchet teeth 63. The lever 65 is provided with a truck 77 adapted to be engaged by cam 78 also mounted upon the shaft 30. The presser foot carrier 58 is also provided with a laterally extending arm 79 to which is secured one end of a spring 80 the opposite end of which is secured to a member 81 pivoted at 82 to the rear of the frame 23. The member 81 is also provided with a lateral cylindrical projection 83 extending over the lateral extension 79 which extension is provided with an upwardly extending flange 84 provided with a perforation through which the thread T passes from the source of supply between the projection 83 and the upper surface of the extension 79, then downwardly through a hole 85 in said extension and upwardly through another hole 86 therein over said projection 83 and downwardly through the hole 87 in said extension along the under face of said extension 79 to an eye 88 and then downwardly into the wax pot 89. The wax pot 89 is clamped to the frame 23 by means of the clamping bolt 90 mounted in a projection 91 formed upon one end of said wax pot. Clamped to one of the inner faces of the wax pot 89 by means of the clamping bolt 92 is a plate 93 having formed thereon a flanged projection 94 in which said clamping bolt 92 is mounted. This plate 93 is provided at its lower end with a roll 94× partially around which the thread T passes, said thread then passing upwardly through the stripper 95 which serves to remove from the thread the surplus wax. The thread then passes to a roll 96 mounted upon the frame 23 from which roll the thread passes to an inner roll 97 mounted upon the thread takeup lever 98, said lever being also provided with an outer thread roll 99 to which the thread passes from the inner roll 97. Intermediate the rolls 97 and 99 and mounted upon the frame 23 is a roll 100 over which the thread T is adapted to pass when the takeup lever 98 is in its lowest position. This takeup lever 98 is pivoted to the stud 21 by the screw 101 and at 102 has pivoted thereto a curved connector 103, the upper end of which is pivoted at 104 to a cam disk 105 mounted upon and movable with the shaft 30. This connector 103 is provided with a recess 106 the walls of which are adapted to partially inclose the shaft 30 during the operation of the machine. The cam 105 is provided with a cam path 107 in which is positioned a truck 108 mounted upon the rear end of a lever 109 pivotally mounted upon a stud 110. This stud 110 is mounted in a bearing in the frame 23 and extends beyond the outer face of said frame, having mounted upon its outer end an adjusting nut 111 between which and the outer face of said frame 23 is a spring 112 tending to retain the face 113 of the lever 109 in frictional contact with the inner face of the frame 23 so that said lever 109 will remain in any position in which it may be placed until positively acted upon by means of one of the walls of the cam path 107. The lever 109 is provided with an upwardly extending arm 114, the upper end of which is provided with a bearing in which is mounted a cylindrical shank 114×, the front end of which has formed thereon a plate 115 having two thread engaging fingers 116 projecting therefrom. The rear end of the cylindrical shank 114× has pinned thereto an operating arm 117. The finger plate 115 is located just beneath the work support 118 which is provided with the usual slot 119 through which the awl and needle pass during the stitch forming operation. Extending downwardly from the work support 118 is a thread guard 120 secured at its lower end to the frame 23. On the rear face of the thread guard 120 is a roll 121 over which the thread T passes from the roll 99 on its way to and through the slot 119 in the work support 118.

Figure 6:
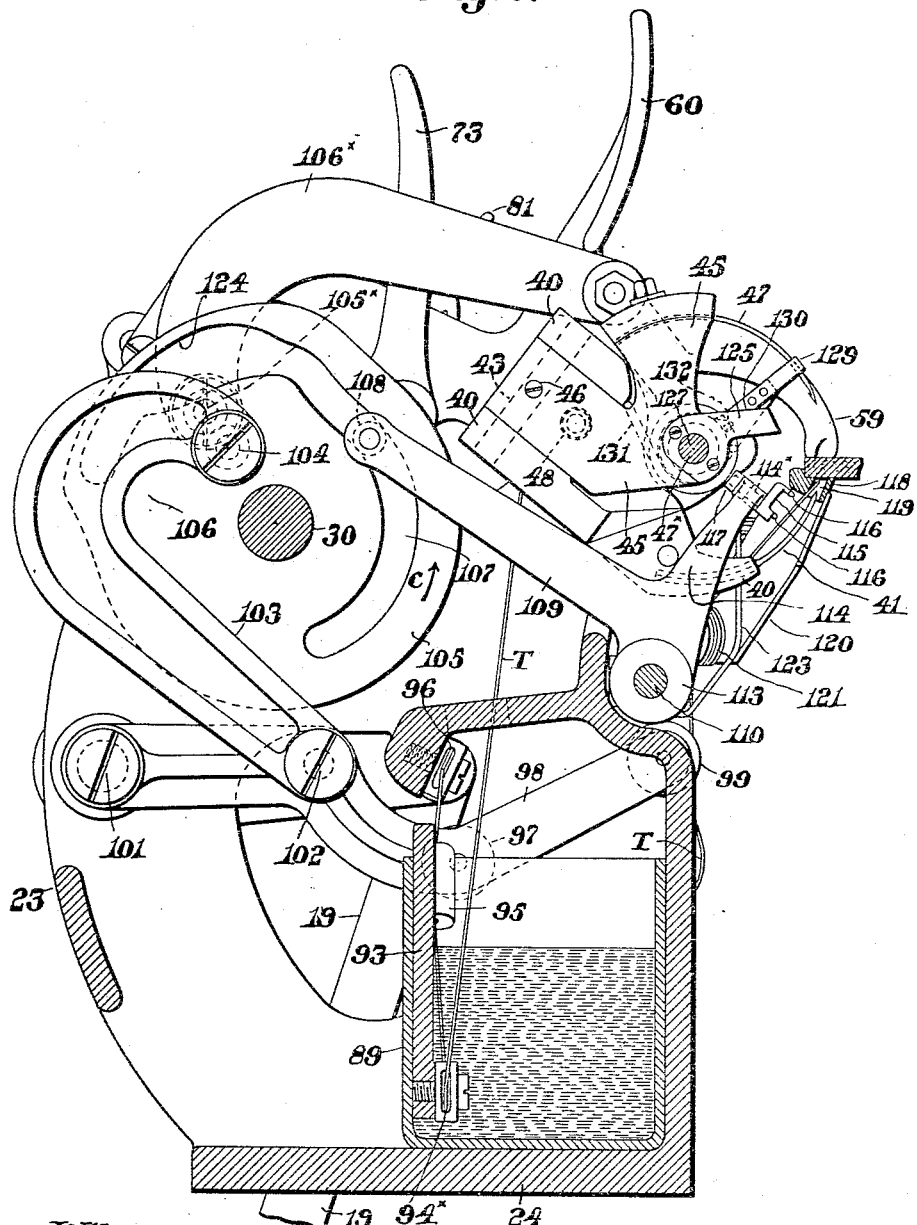
Fig. 6 represents a vertical section of the same, the cutting plane being on line 6—6 on Fig. 1.
Figure 7:
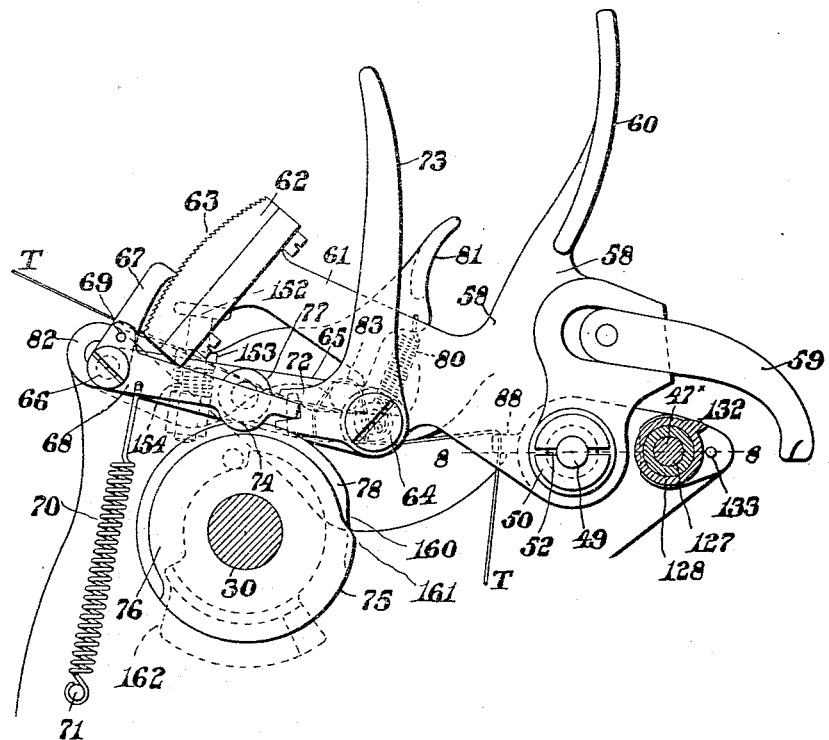
Fig. 7 represents a partial vertical section of the same, the cutting plane being on line 7—7 on Fig. 1.
Figure 8:
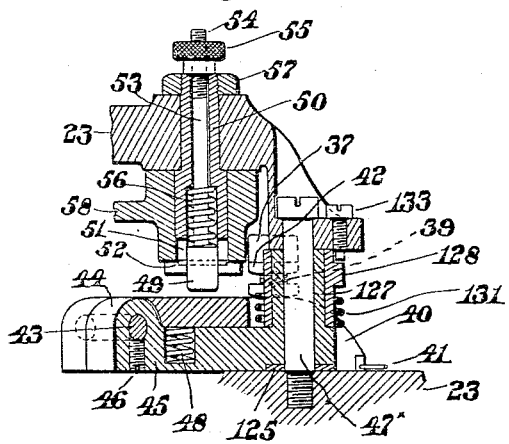
Fig. 8 represents a horizontal section of the same, the cutting plane being on line 8—8 on Fig. 7.
Figure 18:
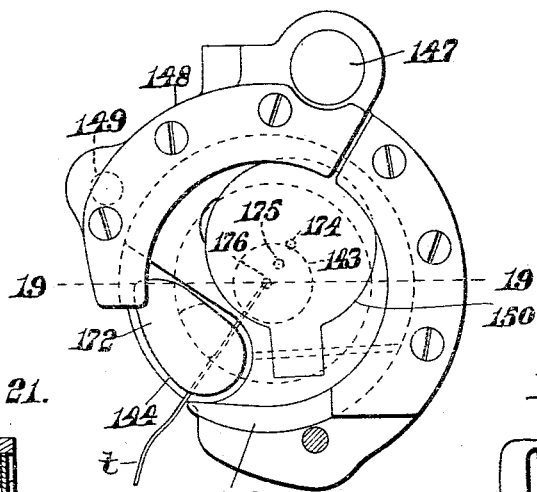
Fig. 18 represents an elevation of the shuttle, its race, and its driving mechanism.
Figure 21:
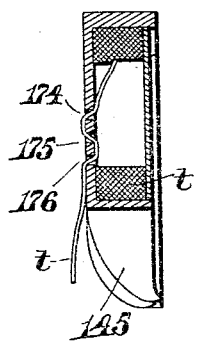
Fig. 21 represents a transverse section through the shuttle.

The thread guard 120 has projecting rearwardly from its rear face the two fingers 122 with which the thread T contacts as it passes from the roll 121 to the work. To the hub of the lever 109 is secured a spring finger 123 the upper end of which is positioned between the projecting fingers 122. This spring member 123 is so constructed that when the lever 109 is moved forwardly about its pivot the end thereof between the fingers 122 will come into contact with the thread T at this point and force it against the rear face of the thread guard, thereby creating sufficient friction thereon as to grip the thread and prevent further movement thereof under normal conditions. The cam path 107 is so constructed that as the cam disk 105 is moved in a direction opposite to that indicated by the arrow c on Fig. 6 of the drawings, the thread engaging fingers 116 will be moved slowly forward to engage the thread T, after which the lever 109 will come to a standstill and at this time the needle 47 will pass downwardly to its lowest position. The finger plate 115 will then be moved about the axis of the shank 114× by means to be hereinafter explained, into the position shown in Figs. 12 and 13, thus causing the thread to be bent with a portion thereof in a substantially horizontal position. Then the continued movement of the cam 105 will cause the upper end of the arm 114 of the lever 109 to be moved further forward so that the horizontal portion of the bent thread will be in the path of the barb of the needle and will be seized thereby as the needle 47 moves upwardly (see Fig. 13).

The fingers 116 are spaced apart sufficiently to take up enough slack in the thread during the bending operation to form the loop that is to be drawn through the work, thereby preventing any drawing of the thread over the barb of the needle, which is liable to weaken and otherwise injure the thread. During the reverse movement of the cam 105, that is, when it is moving in the direction of the arrow c, on Fig. 6 of the drawings, the truck 108 remains at a standstill in contact with the wall 124, while the needle is drawing the thread into the stock, thus preventing the disengagement of the thread from the barb of the needle, and a continued movement of the cam in this direction will return the lever 109 and its supporting members to their normal positions. The finger plate 115 is operated at a predetermined time by a blade 125 secured to the needle carrier 45 coming into contact with the arm 117 until the thread has been bent horizontally and seized by the barb of the needle 47. When the thread has been seized by the needle and has been moved upwardly into the work, the blade 125 is removed from contact with the arm 117 and a spring 126 secured to the opposite end of said arm 117 returns said arm to its normal position preparatory to another operation. The cam disk 105 has also pivotally connected thereto at 105× one end of a curved connecting member 106×, the opposite end of which is articulated to an arm 45× extending upwardly from the needle carrier 45, said carrier 45 having oscillatory movement imparted to it through the connector 106× by the oscillation of the cam 105.

Figure 1:
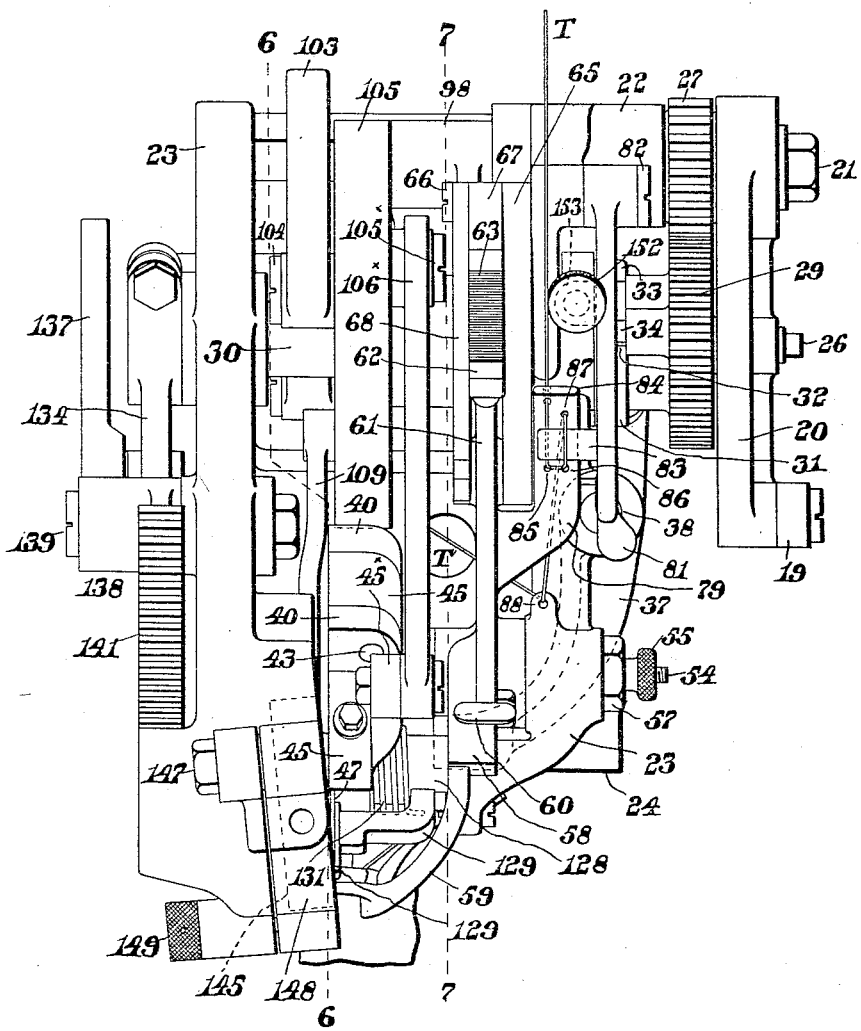
Figure 1 represents a plan of a sewing machine embodying the principles of the present invention.
Figure 2:
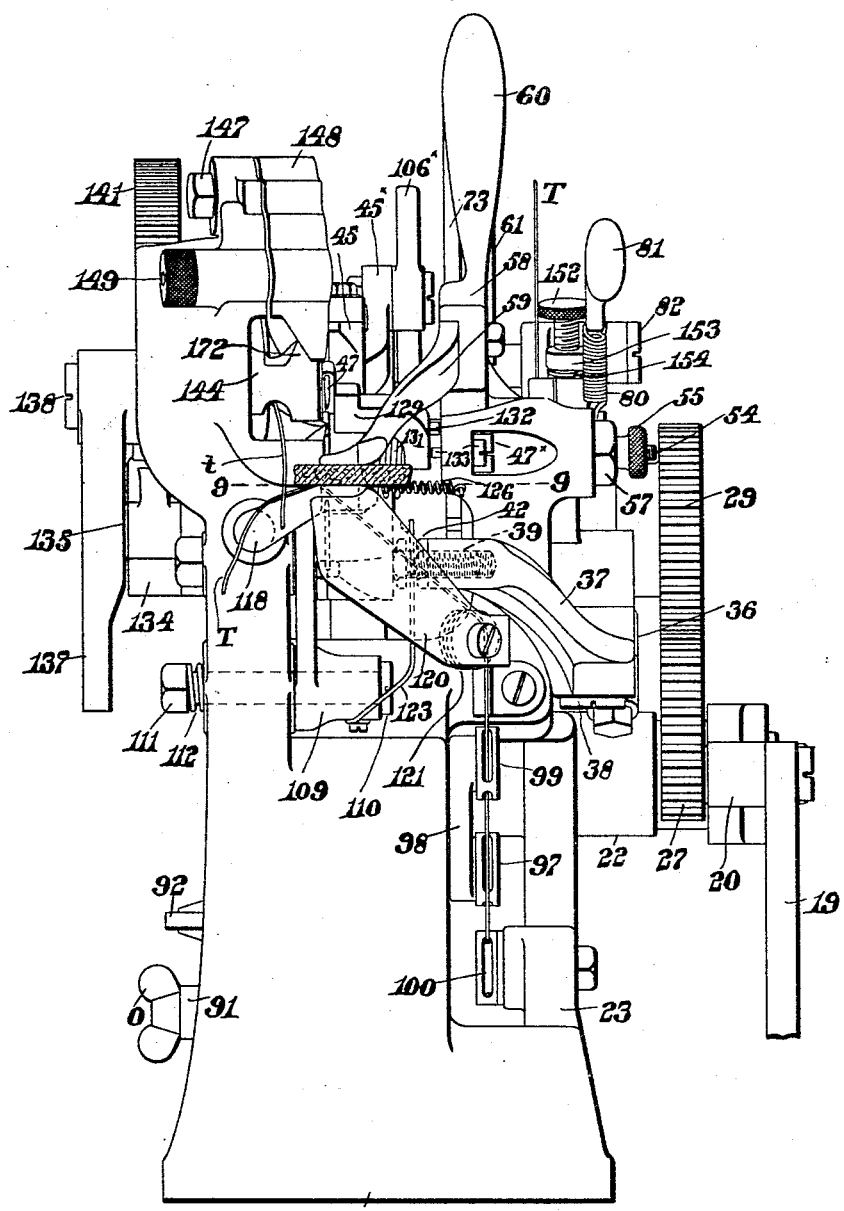
Fig. 2 represents a front elevation of the same.

The needle carrier 45 is provided with a hub 127 on which is mounted the hub 128 of a needle guide 129, said needle guide having a shoulder 130 normally held in contact with the blade 125 by means of the spring 131 surrounding the hub 128. This hub 128 is provided with a shouldered projection 132 adapted to engage a stud 133 mounted in a frame 23 said stud 133 limiting the downward movement of the needle guide 129 when the shouldered projection 132 comes into contact with said stop. The shaft 30 extends beyond the left hand side of the machine and has adjustably secured thereto the arm 134 having a truck 135 at its outer end positioned in a cam groove 136 formed in a curved arm 137 of a lever 138. This lever 138 is pivoted at 139 and is provided with an oppositely extending arm 140 having formed on its outer end a gear segment 141. The teeth of this gear segment 141 engage the teeth of the pinion 142 secured to a shaft 143 formed upon the shuttle drive 144. The shuttle 145 is mounted in a suitable fixed raceway 146 having pivoted thereto, at 147, a cap 148 which is adapted to be locked by a bolt 149. By moving the bolt 149 outwardly, i. e., to the left of Fig. 2 of the drawings, the end thereof will be disengaged from the cap 148, thereby permitting it to be moved upwardly about the pivot 147 to allow the shuttle to be removed from the raceway 146. The lever 81 is provided with a boss 151 to which is threaded an adjusting member 152, said member having threaded thereto a lock-nut 153. Surrounding said adjusting member 152 and between the boss 151 and the lock nut 153 is interposed a spring 154. The nut 153 has a flat-sided contact with the inner face of the lever 81 as indicated in Fig. 1 of the drawings, thereby preventing the rotation of said nut when the member 152 is rotated therein. When the member 152 is rotated the lock nut 153 will move slightly toward the boss 151 compressing the spring 154 and thus permitting the free rotation of said member 152 while being adjusted. As soon as said member 152 has been properly adjusted the expansion of the spring 154 will force the threads of the lock-nut 153 against the threads of the member 152 preventing further rotation of said member 152 in the nut 153 and as the nut 153 is prevented from turning on account of its flat face contacting with the inner face of the lever 81 it is obvious that the adjusting member 152 will be locked in its adjusted position. This member 152 is for the purpose of regulating the distance the lock of the stitch will be from the face of the work being operated upon, it being obvious that by adjusting the member 152 this lock may be located at any distance from the surface within reasonable limits. This is due to the fact that all of the instrumentalities that assist in the formation of the stitch are all operated by means of the oscillating driving shaft 30 and if the time of operation of the thread measuring device is varied relatively to the operations of the other instrumentalities the location of the lock of the stitch will also be varied, this location depending on the amount of thread measured off.

As the measurement of the thread is due to the movement of the lever 81 about its pivot and as this movement is caused by the engagement of the shoulder 162 with the end of the member 152 it is obvious that by varying the positions of the engaging end of the member 152 the operation of the thread measuring device will be correspondingly varied and as a consequence the location of the lock of the stitch from the surface of the work will be similarly varied.

When the member 152 has been adjusted for any particular work its position remains unchanged and at each oscillation of the cam shoulder 162 the same amount of movement will be imparted to the lever 81.

As the operation of the machine continues, when there is any variation in the thickness of the material, the measurement of the thread will be automatically changed by the variation in the position of the presser foot upon said material. This is due to the fact that the thread measurer 83 and the presser foot 59 are equidistant from the fulcrum 54 so that when the presser foot is lifted a given distance to accommodate an increased thickness of material the lowering of the extension 79 will pull out more thread to accommodate this increased thickness of material.

When for any reason it is desired to pull out a quantity of thread T from the source of supply the operator may accomplish this by lifting the lever 81 and thereby drawing out the necessary length of thread which may then be pulled through the work support 118.

When the work is to be inserted, the operator seizes the handles 60—73 and by pressing them toward each other releases the pawl 67 from the teeth 63, thereby permitting the presser foot 59 to be lifted. When the work has been positioned, the presser foot 59 is moved into contact with the work and the handles 60—73 are released, thus permitting the pawl 67 to return into engagement with the teeth 63.

During the operation of the machine, the parts 58—65 and 68 are normally locked together, the cam 78 acting upon the roller 77 and retaining the presser foot 59 in gripping contact with the work. When the feeding operation is about to occur, the gripping pressure upon the work will be released by the roller 77 entering the depression 160 in the cam 78 and the spring 70 causing the presser foot to be slightly lifted from the work.

The continued oscillation of the shaft 30 will cause the cam throw 161 to act upon the cam projection 74 and release the pawl 67 from the teeth 63 so that the presser foot 59 at the completion of each feeding operation may accommodate itself to any variations in the thickness of the work when returning into contact therewith.

At this time the projection 74 is in contact with the cam 75 and acts as a fulcrum whereby the action of the spring 70 will pull down the rear end of the member 65 and lift the front end thereof, thus causing the presser foot to be moved into light contact with the work after which the cam throw 161 being removed from contact with the projection 74 the pawl 67 will engage the teeth 63 and the continued reverse movement of the cam 78 will cause the presser foot to grip the work.

It is obvious that the presser foot 59 is first brought into light contact with the work and subsequently the gripping pressure thereon is effected by the cam 78 and that this gripping pressure is the same regardless of the thickness of the material.

At every oscillation of the cam 35 the end 162 thereof will act upon the member 152 to move the lever 81 about the pivot 82, thereby moving the lateral projection 83 away from the extension 79 and measuring off the required amount of thread to form the stitch.

This projection 83 is normally retained in contact with the upper face of the extension 79 and binds on the thread T, passing through the flange 84 to the opening 85.

It is obvious that when this extension assumes a lower position, due to the increased thickness of the work, a greater amount of thread will be delivered inasmuch as the limit of the upward movement of the lever 81 is always the same.

The cam groove 136 in the arm 137 of the shuttle driving lever is so constructed that the shuttle will remain at rest for a given period, will then have a constantly increasing rotation for a given time and will then rotate at a constantly decreasing speed.

When the thread is to be delivered from the needle the shuttle will have its greatest speed moving more rapidly than the needle and thereby insuring the removal of the thread from the needle which is moving in the same direction as the shuttle.

When it is desired to operate the machine by hand the lever 20 is removed by disconnecting the locking member 26 and then placing upon the hub 164 of the gear segment 27 the lever 165 having recessed shoulders 166 and 167 therein adapted to contact with the stop member 168 screwed into the hole 169 in the end of the shaft 30. This stop member is provided with a peripheral collar of resilient material 170 to deaden the blow when the walls of the recesses 166—167 come into contact with the stop member.

By grasping the handle 171 the operator may oscillate the lever 165 and effect an operation of the machine.

Figure 20:
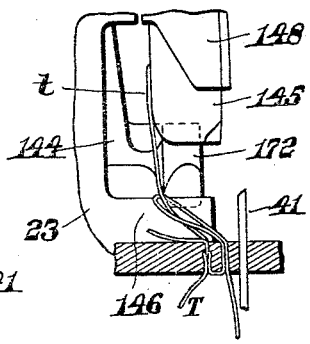
Fig. 20 represents a front view of the shuttle mechanism showing the means for preventing the entanglement of the shuttle thread with the awl.
Figure 19:
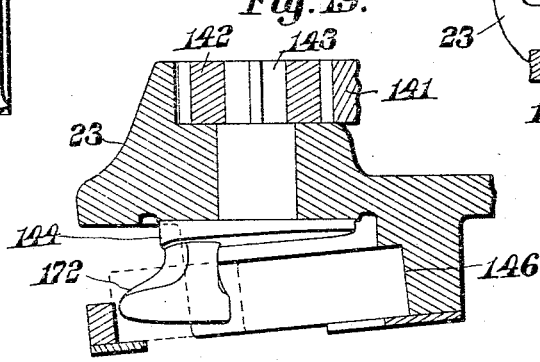
Fig. 19 represents a horizontal plan of the same, the cutting plane being on line 19—19 on Fig. 18, the shuttle being removed from its raceway.

The shuttle driver 144 is provided with a cam projection 172 which is adapted to engage the thread $t$ when it has been passed through the loop of under thread drawn through the work and force this thread and the loop away from the awl on its upward movement through the work, all as shown in Fig. 20 of the drawings. This cam projection 172 is of considerable importance for by its use the entanglement of the thread with the awl is wholly obviated, making it possible to use any desired length of awl, and does away with the necessity of changing awls for various thicknesses of material.

The shuttle thread $t$ in a coil is placed in the receptacle 150 therefor and passes outwardly through the hole 174 in one wall of the shuttle, along the outer face of said wall to the hole 175 through which it passes inwardly into the recess 150, and then to the hole 176 to the outer wall of the shuttle and thence to the work.

In the operation of the machine, the operator grasps the handles 60 and 73, moving them toward each other, thereby disengaging the pawl 67 from the teeth 63, thus permitting the presser foot 59 to be moved upwardly about the fulcrum 54 of the presser foot carrier. The work is then placed upon the work support 118 and the operator then releases the handles 60 and 73, permitting the spring 70 to move the presser foot 59 into contact with the upper face of the work, the pawl 67 at the same time being moved into engagement with the teeth 63, and locking the various members together.

The distance of the lock of the stitch from the surface of the work may be determined accurately by the adjustment of the member 152. The gear segment 27 is then oscillated either manually or by means of the treadle 14 or by means of a belt positioned in a groove 18ˣ of the fly wheel 18. This oscillation of the segment 27 will impart oscillatory movement to the gear 29, and through this gear 29 to the main driving shaft 30. The pin 34 on the gear 29 will coact with the shoulders 32 and 33 of the cam member 35 and move this cam member 35 at the end of the movement of the pin 34 in either direction. The movement of the cam 35 will operate the lever 37 moving it about its pivot 38 and cause the bearing member 39 to force the awl carrier 40 toward the needle carrier 45, the awl 41 at this time being in the work and causing the work to be fed so that the puncture therein caused by the awl will be brought into the plane of the needle 47, the awl 41 on completing its reverse movement being returned to its normal position by means of the spring 48. This reverse movement of the awl carrier does not occur until the point of the awl is entirely free from the under face of the work.

Any required feed may be obtained by adjusting the feed controlling member 49. During every oscillation of the cam 35 the heel portion 162 thereof coacts with the adjustable member 152 and raises the lever 81 about its pivot 82 against the tension of the spring 80. This lifting of the lever 81 will cause the lateral projection 83 thereon to be moved upwardly away from the extension 79 on the presser foot carrier 58, thus drawing from the source of supply the necessary length of thread T for the formation of the next stitch. Normally the presser foot 59 is retained in gripping contact with the work by means of the cam 78 acting upon the roll 77 mounted upon the lever 65 pivoted at one end to the presser foot carrier 58 and at the other to the pawl lever 68. When the feeding operation is about to take place the depression 160 in the cam 78 in the movement of the latter comes to a point opposite the roll 77 and permits said roll 77 to be lowered and the presser foot 59 to be raised by means of the spring 70 which retains the pawl 67 in engagement with the ratchet 63 and simultaneously pulls down the rear end of the rearward extension 61 of the presser foot carrier 58. The cam throw 161 immediately acts upon the pawl lever 68 to disengage it from the teeth 63 and the spring 70 then acts upon the lever 65 with the roll 77 as a fulcrum and causes the presser foot to be brought into light contact with the upper surface of the work in its fed position. The return movement of the cams 75 and 78 will cause the pawl 67 to first engage with the teeth 63 and then as the roll 77 moves from the depression 160 onto the higher portion of the cam 78 the presser foot 59 will be forced into gripping contact with the work. It is obvious that by this construction means is provided whereby at every movement of the work the presser foot may adjust itself for variations in thickness of the material. It is obvious also that by the presser foot 59 changing its position for varying thicknesses of material, the lateral extension 79 on the carrier 58 will be raised or lowered and consequently a lesser or greater amount of thread T will be drawn from the source of supply, and to take care of these variations in the thickness of the material being acted upon. This amount of thread drawn from the source of supply will be taken up during the downward movement of the takeup lever 98 and when this lever 98 moves upwardly there will be a given amount of slackness in the thread T between the roll 100 and the roll 99 and there will be no tension upon the under thread when the stitch forming operation occurs. This slackness in the thread T is taken up when the thread is being drawn over the highest point of the shuttle.

As the needle 47 passes down through the work the thread bender 115 will be moved forward and the blade 125 will strike the arm 117 and cause the fingers 116 to engage the thread T and bend it into a substantially horizontal position. The thread bender 115 will then be moved farther forward so that the thread T will bear against the inside of the needle, as shown in Fig. 13 of the drawings, thus insuring the thread being seized by the barb of the needle as said needle moves upwardly through the work. During this thread bending operation the spring member 123 is in engagement with the thread T at a point intermediate the two rearwardly extending fingers 122 on the thread guard 120. As has been previously described, when the blade 125 moves upwardly with the needle carrier 45, the spring 126 will return the thread bender 115 to its normal position as indicated in Fig. 11 of the drawings.

Heretofore in machines of this class, considerable difficulty has been found in the shuttle thread T becoming entangled with the awl in its upward movement and making it necessary to use short awls and change these awls for various thicknesses of material so that the point thereof will protrude but slightly above the surface of the work.

This makes a very compact machine with parts reduced to a minimum, which is very effective in its operation, all of the operating devices being driven from a single oscillating driving shaft.

It is believed that the operation and many advantages of this machine will be fully understood from the foregoing description.

Having thus described my invention, I claim:

1. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread measuring mechanism; a thread placing mechanism; a work feeding mechanism; and means interposed between said mechanisms and shaft and actuated by the oscillation of the latter whereby all of said mechanisms may be actuated by said shaft during each oscillation thereof, said means consisting in part of independent operating devices mounted on said shaft.

2. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread measuring mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

3. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread measuring mechanism; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

4. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread measuring mechanism; and means interposed between said mechanism and shaft and actuated by the oscillation of the latter whereby all of said mechanisms may be actuated by said shaft during each oscillation thereof, said means consisting in part of independent operating devices mounted on said shaft.

5. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread placing mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

6. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

7. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

8. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a shuttle operating mechanism; and means interposed between said mechanism and shaft and actuated by the oscillation of the latter whereby all of said mechanisms may be actuated by said shaft during each oscillation thereof, said means consisting in part of independent operating devices mounted on said shaft.

9. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread measuring mechanism; a thread placing mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

10. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread measuring mechanism; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

11. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread measuring mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

12. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft; means for oscillating said shaft; a thread placing mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

13. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread measuring mechanism; and means interposed between said mechanism and shaft and actuated by the oscillation of the latter whereby all of said mechanisms may be actuated by said shaft during each oscillation thereof, said means consisting in part of independent operating devices mounted on said shaft.

14. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

15. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; and means interposed between said mechanism and shaft and actuated by the oscillation of the latter whereby all of said mechanisms may be actuated by said shaft during each oscillation thereof, said means consisting in part of independent operating devices mounted on said shaft.

16. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

17. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

18. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread placing mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

19. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread measuring mechanism; and means interposed between said mechanism and shaft and actuated by the oscillation of the latter whereby all of said mechanisms may be actuated by said shaft during each oscillation thereof, said means consisting in part of independent operating devices mounted on said shaft.

20. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread measuring mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

21. In a wax thread lockstitch sewing machine, the combination of an oscillating needle and awl carrying mechanism; an oscillating presser foot mechanism; a main framework in which said mechanisms are mounted and having side frames provided with a pair of alined bearings; an oscillating driving shaft in said bearings; means for oscillating said shaft; a thread measuring mechanism; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

22. In a wax thread lockstitch sewing machine, the combination of an oscillating needle carrying mechanism; an oscillating awl carrying mechanism; a main framework in which said mechanisms are mounted and having side frames provided with a pair of alined bearings; an oscillating driving shaft in said bearings; means for oscillating said shaft; and means interposed between said mechanism and shaft and actuated by the oscillation of the latter whereby both of said mechanisms may be actuated by said shaft during each oscillation thereof, said means consisting in part of independent operating devices mounted on said shaft.

23. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a work feeding mechanism; and means interposed between said mechanism and shaft and actuated by the oscillation of the latter whereby all of said mechanisms may be actuated by said 24. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

25. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a thread measuring mechanism; and means interposed between said mechanism and shaft and actuated by the oscillation of the latter whereby all of said mechanisms may be actuated by said shaft during each oscillation thereof, said means consisting in part of independent operating devices mounted on said shaft.

26. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a shuttle operating mechanism; and means interposed between said mechanism and shaft and actuated by the oscillation of the latter whereby all of said mechanisms may be actuated by said shaft during each oscillation thereof, said means consisting in part of independent operating devices mounted on said shaft.

27. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a thread placing mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

28. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a thread measuring mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

29. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a shuttle operating mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

30. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a thread measuring mechanism; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

31. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a shuttle operating mechanism; a thread placing mechanism; and means interposed between said mechanism and shaft and actuated by the oscillation of the latter whereby all of said mechanisms may be actuated by said shaft during each oscillation thereof, said means consisting in part of independent operating devices mounted on said shaft.

32. In a wax thread lockstitch sewing machine, the combination of an oscillating needle and awl carrying mechanism; a main framework in which said mechanisms are mounted and having side frames provided with a pair of alined bearings; an oscillating driving shaft in said bearings; means for oscillating said shaft; a shuttle operating mechanism; a thread measuring mechanism; and means interposed between said mechanism and shaft and actuated by the oscillation of the latter whereby all of said mechanisms may be actuated by said shaft during each oscillation thereof, said means consisting in part of independent operating devices mounted on said shaft.

33. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a work feeding mechanism; and means interposed between said mechanism and shaft and actuated by the oscillation of the latter whereby both of said mechanisms may be actuated by said shaft during each oscillation thereof, said means consisting in part of independent operating devices mounted on said shaft.

34. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a thread placing mechanism; and means interposed between said mechanism and shaft whereby both of said mechanisms may be actuated by said shaft during each oscillation thereof, said means consisting in part of independent operating devices mounted on said shaft.

35. In a wax thread lockstitch sewing machine, the combination of a presser foot mechanism; a main framework in which said mechanisms are mounted and having side frames provided with a pair of alined bearings; an oscillating driving shaft in said bearings; a shuttle operating mechanism; and means interposed between said mechanism and shaft and actuated by the oscillation of the latter whereby both of said mechanisms may be actuated by said shaft during each oscillation thereof, said means consisting in part of independent operating devices mounted on said shaft.

36. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread placing mechanism; and means interposed between said mechanism and shaft and actuated by the oscillation of the latter whereby all of said mechanisms may be actuated by said shaft during each oscillation thereof, said means consisting in part of independent operating device mounted on said shaft.

37. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread measuring mechanism; and means interposed between said mechanism and shaft and actuated by the oscillation of the latter whereby all of said mechanisms may be actuated by said shaft during each oscillation thereof, said means consisting in part of independent operating devices mounted on said shaft.

38. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a shuttle operating mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

39. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread placing mechanism; a thread measuring mechanism; and means interposed between said mechanism and shaft and actuated by the oscillation of the latter whereby all of said mechanisms may be actuated by said shaft during each oscillation thereof, said means consisting in part of independent operating devices mounted on said shaft.

40. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread placing mechanism; a work feeding mechanism; and means interposed between said mechanism and shaft and actuated by the oscillation of the latter whereby all of said mechanisms may be actuated by said shaft during each oscillation thereof, said means consisting in part of independent operating devices mounted on said shaft.

41. In a wax thread lockstitch sewing machine, the combination of an oscillating presser foot mechanism; a main framework in which said mechanisms are mounted and having side frames provided with a pair of alined bearings; an oscillating driving shaft in said bearings; means for oscillating said shaft; a shuttle operating mechanism; a thread measuring mechanism; a thread placing mechanism; a work feeding mechanism; and means interposed between said mechanism and shaft and actuated by the oscillation of the latter whereby all of said mechanisms may be actuated by said shaft during each oscillation thereof, said means consisting in part of indepedendent operating devices mounted on said shaft.

42. In a wax thread lockstitch sewing machine, the combination of an oscillating shuttle operating mechanism; a thread take-up mechanism; an oscillating needle and awl mechanism; a mechanism for placing the thread upon the barb of the needle; a main framework in which said mechanisms are mounted and having side frames provided with a pair of alined bearings; a continuously oscillating driving shaft in said bearings; and a plurality of independent devices mounted on said shaft for actuating all of said mechanisms during each oscillation of said shaft.

43. In a wax thread lockstitch sewing machine, the combination of an oscillating shuttle operating mechanism; a thread take-up mechanism; an oscillating needle and awl mechanism; a main framework in which said mechanisms are mounted and having side frames provided with a pair of alined bearings; a continuously oscillating driving shaft in said bearings; and a plurality of independent devices mounted on said shaft for actuating all of said mechanisms during each oscillation of said shaft.

44. In a wax thread lockstitch sewing machine, the combination of a thread takeup mechanism; a main framework in which said mechanisms are mounted and having side frames provided with a pair of alined bearings; a continuously oscillating driving shaft in said bearings; and link and lever connections between said shaft and takeup mechanism whereby the latter will be actuated at each oscillation of said shaft.

45. In a wax thread lockstitch sewing machine, the combination of a needle and awl-carrying mechanism; a main framework in which said mechanisms are mounted and having side frames provided with a pair of alined bearings; a continuously oscillating driving shaft in said bearings; and link and lever connections between said shaft and needle and awl carrying mechanism whereby the latter will be actuated at each oscillation of said shaft.

Signed by me at 4 Post Office Sq., Boston, Mass., this 12th day of February, 1915.

PETER SJOSTROM.

Witnesses:
  WALTER E. LOMBARD,
  NATHAN C. LOMBARD.

Copies of this patent may be obtained for five cents each, by addressing the "Commissioner of Patents, Washington, D. C."